United States Patent [19]

Kinoshita

[11] Patent Number: 4,703,146

[45] Date of Patent: Oct. 27, 1987

[54] WIRE EDM TAPER CUTTING METHOD USING PATH DATA OF TWO PLANES OF A WORKPIECE

[75] Inventor: Mitsuo Kinoshita, Tokyo, Japan

[73] Assignee: Fanuc Ltd., Minamitsuru, Japan

[21] Appl. No.: 732,010

[22] PCT Filed: Sep. 6, 1984

[86] PCT No.: PCT/JP84/00426

§ 371 Date: Apr. 26, 1985

§ 102(e) Date: Apr. 26, 1985

[87] PCT Pub. No.: WO85/01001

PCT Pub. Date: Mar. 14, 1985

[30] Foreign Application Priority Data

Sep. 6, 1983 [JP] Japan .................... 58-163713

[51] Int. Cl.$^4$ .................. B23H 7/06; G05B 19/25
[52] U.S. Cl. ................ 219/69 W; 219/69 M; 318/572; 364/168
[58] Field of Search ............. 219/69 W, 69 M, 69 C; 318/570, 572; 364/168, 475

[56] References Cited

U.S. PATENT DOCUMENTS

| | | | |
|---|---|---|---|
| 4,314,133 | 2/1982 | Pfau et al. | 219/69 W |
| 4,355,223 | 10/1982 | Inoue et al. | 219/69 M |
| 4,363,948 | 12/1982 | Itoh | 219/69 W |
| 4,467,166 | 8/1984 | Gamo et al. | 219/69 M |
| 4,559,601 | 12/1985 | Kishi et al. | 219/69 W |

FOREIGN PATENT DOCUMENTS

| | | | |
|---|---|---|---|
| 83858 | 7/1983 | European Pat. Off. | 219/69 C |
| 112194 | 9/1977 | Japan . | |
| 54-99294 | 8/1979 | Japan | 219/69 C |
| 117997 | 9/1979 | Japan | 219/69 W |
| 106994 | 9/1979 | Japan | 219/69 W |
| 56-39825 | 4/1981 | Japan | 219/69 W |
| 56-39832 | 4/1981 | Japan | 219/69 W |
| 58-51020 | 3/1983 | Japan | 219/69 C |
| 109224 | 6/1983 | Japan | 219/69 C |
| 114822 | 7/1983 | Japan | 219/69 M |
| 2041574 | 9/1980 | United Kingdom | 219/69 C |

Primary Examiner—A. D. Pellinen
Assistant Examiner—Geoffrey S. Evans
Attorney, Agent, or Firm—Staas & Halsey

[57] ABSTRACT

A wire electric discharge machining method for cutting a workpiece (WK) by moving a wire electrode (WR) relative to the workpiece and producing an electric discharge across the wire electrode and workpiece, the method including preparing and entering path data specifying contours to be cut on upper (APL) and lower (BPL) planes of the workpiece, separately preparing and entering such auxiliary data as an amount of wire diameter compensation, workpiece mounting position and guide positions necessary for moving the wire electrode (WR) relative to the workpiece (WK), obtaining relative path data between the workpiece and an upper guide (UG) tensioning the wire electrode as well as relative path data between the workpiece and a lower guide (DG) tensioning the wire electrode by using the path data and the auxiliary data, and taper cutting contours commanded on the upper and lower planes of the workpiece by moving the upper and lower guides relative to the workpiece using both path data.

1 Claim, 16 Drawing Figures

WIRE EDM TAPER CUTTING METHOD USING PATH DATA OF TWO PLANES OF A WORKPIECE

TECHNICAL FIELD

This invention relates to a wire electric discharge machining method and, more particularly, to a wire electric discharge machining method for subjecting a workpiece to taper cutting by directly programming the cut contour of the upper and lower surfaces of the workpiece.

BACKGROUND ART

As is well-known in the art, a wire-cut electric discharge machine has a wire electrode stretched between an upper guide and a lower guide and machines a workpiece by producing an electrical discharge between the wire electrode and the workpiece. The workpiece, secured to a table, is transported in X and Y directions along a machining contour in response to commands from a numerical control apparatus. When the wire electrode is tensioned normal to the table (workpiece), the upper and lower surfaces of the workpiece will be machined into contours which are identical. If the arrangement is such that the upper guide can be displaced in the X and Y directions (referred to as the U and V axes) to incline the wire electrode with respect to the workpiece as by displacing the upper guide in a direction at right angles to the direction of workpiece movement, then the upper and lower surfaces of the workpiece will not be cut to the same contour, and the surface cut by the wire electrode will be inclined. This is so-called taper cutting.

FIG. 1 is a view for explaining such taper cutting, in which a wire electrode WR is stretched between an upper guide UG and a lower guide DG at a predetermined angle of inclination with respect to a workpiece WK. If we take the lower plane BPL of the workpiece WK as the programmed plane (the upper plane APL of the workpiece WK may also serve as the programmed plane), and if we let a denote the taper angle, H the distance between the upper guide UG and lower guide DG, and h the distance from the lower guide DG to the lower plane BPL of the workpiece WK, then the offset $d_1$ of the lower guide DG and the offset $d_2$ of the upper guide UG with respect to the lower plane BPL of the workpiece, may be expressed as follows:

$$d_1 = h \cdot \tan\alpha + \frac{d}{2} \quad (1)$$

$$d_2 = H \cdot \tan\alpha - h \cdot \tan\alpha - \frac{d}{2} \quad (2)$$

$$= H \cdot \tan\alpha - d_1$$

Note that d is the cut width.

Accordingly, if the movement of the upper guide UG between which the wire electrode WR is stretched is so controlled in relation to workpiece movement that the offsets $d_1$, $d_2$ remain constant, then taper cutting at the taper angle a can be carried out, as shown in FIG. 2. The dashed line and one-dot chain line in FIG. 2 indicate the paths of the upper and lower guides UG, DG, respectively.

In performing taper cutting with such a wire-cut electric discharge machine, a programmed path in the upper or lower plane of the workpiece, feedrate on the programmed path, taper angle a and distances H, h, etc., are commanded as set forth above and cutting is carried out in the manner commanded. According to this method, taper cutting can be carried out through simple control if the taper angle is constant.

With the foregoing method, however, it is difficult to perform cutting of the type in which the taper angle changes in continuous fashion. For example, cutting in accordance with the conventional method is difficult if the centers of circular arcs $C_u$, $C_d$ (cut contours) on the upper and lower planes of a workpiece do not agree, as shown in FIG. 3, if the positions of rectangles $R_u$, $R_d$ (cut contours) on the upper and lower planes of a workpiece are skewed with respect to each other, as shown in FIG. 4, or if the contours to be cut on the upper and lower planes of a workpiece differ.

SUMMARY OF THE INVENTION

Accordingly, an object of the present invention is to provide a wire electric discharge machining method through which taper cutting can be simply performed even for a contour having a continuously changing taper angle, and even if the contours cut on the upper and lower planes of a workpiece differ.

Another object of the present invention is to provide a wire electric discharge machining method capable of forming NC data from path data specifying contours to be cut on the upper and lower planes of a workpiece.

A further object of the present invention is to provide a wire electric discharge machining method wherein NC data need not be recreated even when there is a change in a workpiece mounting position, a guide position or an amount of wire diameter compensation.

The present invention provides a wire electric discharge machining method for cutting a workpiece by moving a wire electrode relative to the workpiece and producing an electric discharge across the wire electrode and workpiece. According to the present invention, the method includes preparing and entering path data specifying contours to be cut on upper and lower planes of a workpiece, separately preparing and entering such auxiliary data as an amount of wire diameter compensation, workpiece mounting position and guide positions necessary for moving the wire electrode relative to the workpiece, obtaining relative path data between the workpiece and an upper guide tensioning the wire electrode as well as relative path data between the workpiece and a lower guide tensioning the wire electrode by using the path data and the auxiliary data, and taper cutting contours commanded on the upper and lower planes of the workpiece by moving the upper and lower guides relative to the workpiece using both path data.

DESCRIPTION OF THE PREFERRED EMBODIMENTS

Figure 1:
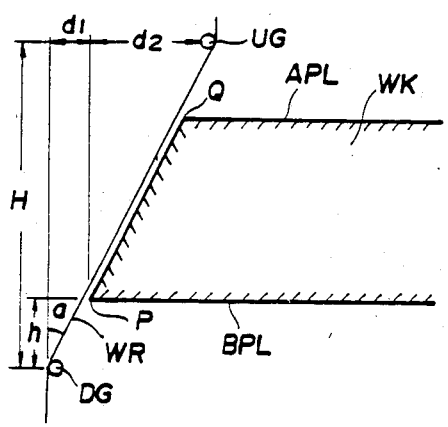
FIGS. 1 ahd 2 are views for describing a conventional taper cutting method.
Figure 2:
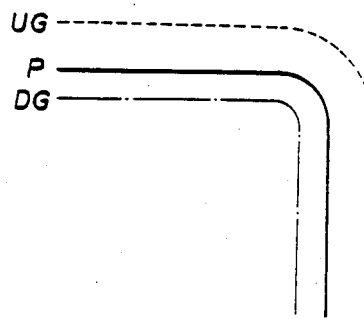
Figure 3:
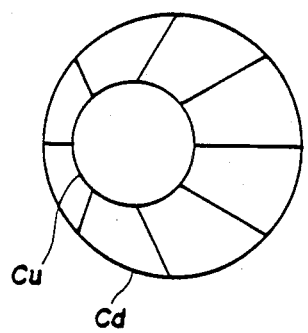
FIGS. 3 and 4 are cut contour views for describing the drawbacks of the prior art.
Figure 4:
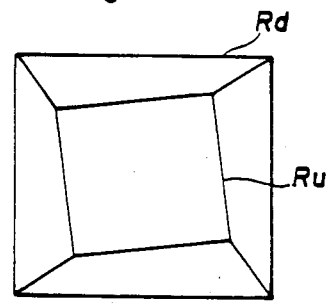
Figure 7:
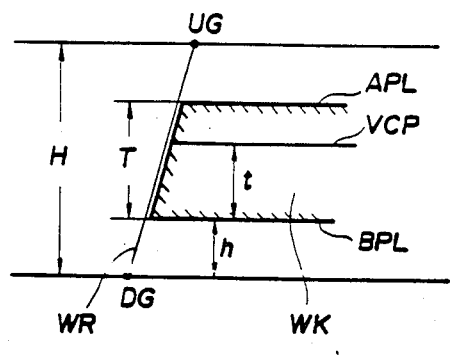
FIG. 7 is a view for describing auxiliary data.
Figure 5:
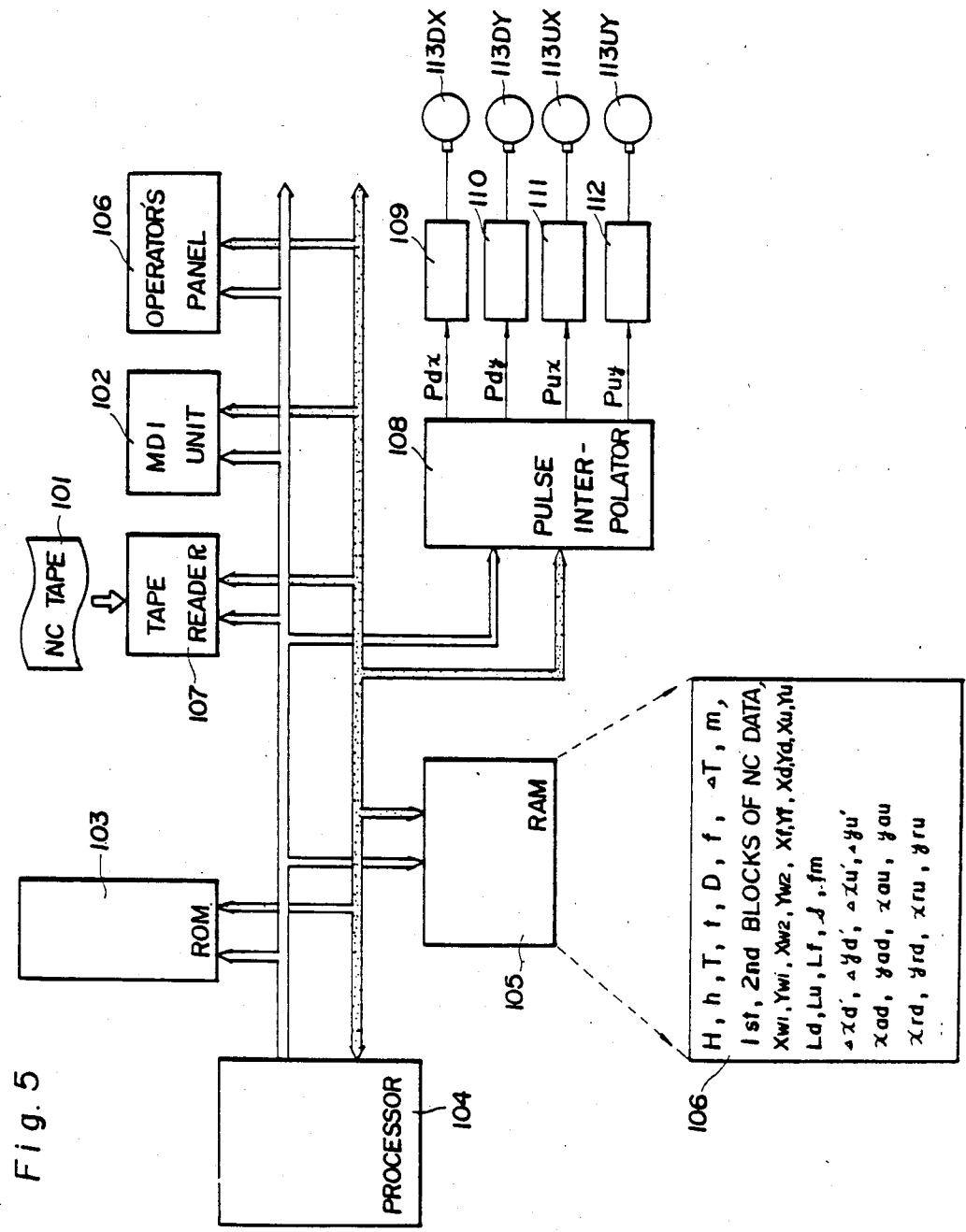
FIG. 5 is a block diagram for practicing a first wire electric discharge machining method according to the present invention.
Figure 6:
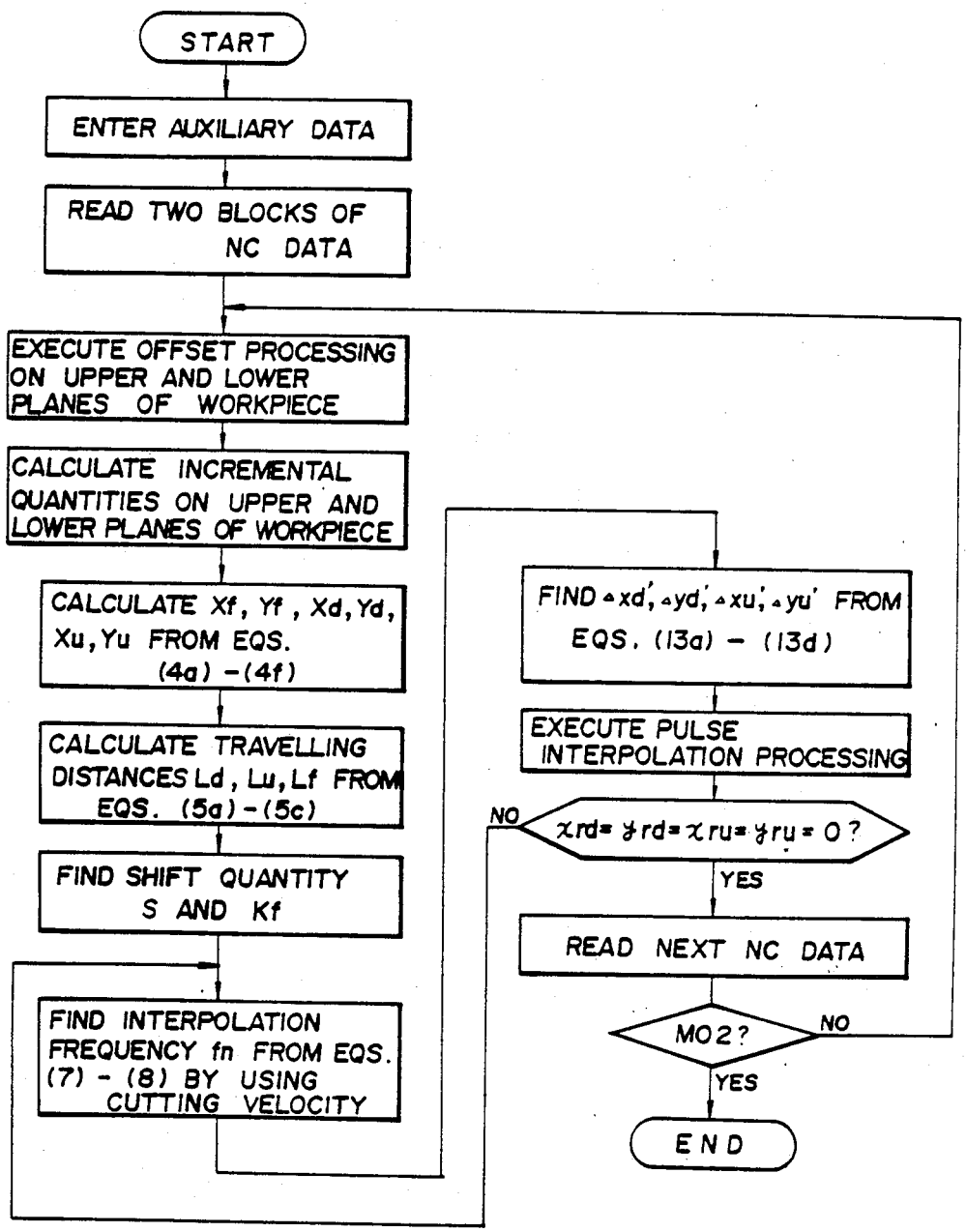
FIG. 6 is a flowchart of processing associated with the method.
Figure 8:
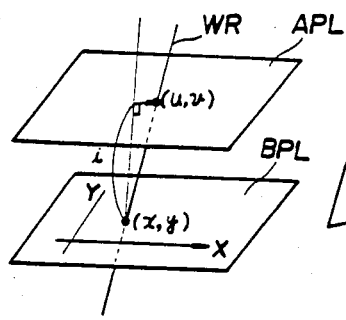
FIGS. 8 through 12 are views for describing programming methods.

FIG. 5 is a block diagram for practicing a first wire electric discharge machining method according to the present invention, FIG. 6 is a flowchart of processing associated with the method, FIG. 7 is a view for describing auxiliary data, and FIGS. 8 through 12 are views for describing programming methods.

Path data (NC data) specifying the cut contours on the upper and lower planes of a workpiece are recorded beforehand on an NC tape 101. The NC data are created in accordance with rules set forth below. It should be noted that there are cases where the upper and lower planes of the workpiece are referred to as programmed planes and programmed auxiliary planes. Either the programmed plane or programmed auxiliary plane may the upper plane of the workpiece.

(1) NC data for setting coordinate system
G92XxYyIi;

The foregoing NC data are for setting a coordinate system. The coordinate system setting is commanded by the G-function instruction "G92", the present position of the wire electrode WR on the programmed plane BPL (FIG. 8) is commanded by the numerical values x, y that follow the respective word addresses "X", "Y", and the distance between the programmed plane and the programmed auxiliary plane (namely the thickness of the workpiece) is commanded by the numerical value i following the word address "I". Note that i shall be positive if the programmed auxiliary plane is the upper plane as seen from the programmed plane, and negative if the programmed auxiliary plane is the lower plane. The position of the wire electrode on the programmed auxiliary plane is calculated automatically from the inclination of the wire electrode and therefore need not be commanded.

Figure 9:
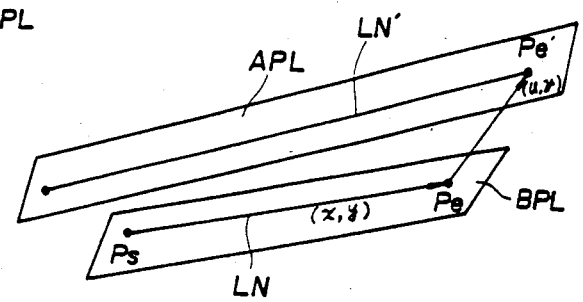

(2) NC data for linear motion
G01XxYyUuVv;

In a case where the wire electrode paths (cut contours) on the programmed plane BPL and programmed auxiliary plane APL are LN, LN', respectively, as shown in FIG. 9, the paths are specified by the linear motion G-function instruction "G01" and the numerical values x, y, u, v that follow the word addresses "X", "Y", "U", "V", respectively. The values of x, y specifying the path LN on the programmed plane BPL are incremental quantities along the respective axes from a starting point $P_s$ to an end point $P_e$ of the path on the programmed plane. The values of u, v specifying the path LN' on the programmed auxiliary plane APL are deviation quantities along the respective axes between the path end point $P_e$ on the programmed plane BPL and a path end point $P_e'$ on the programmed auxiliary plane (a deviation quantity in the direction of workpiece thickness is not considered).

Figure 10:
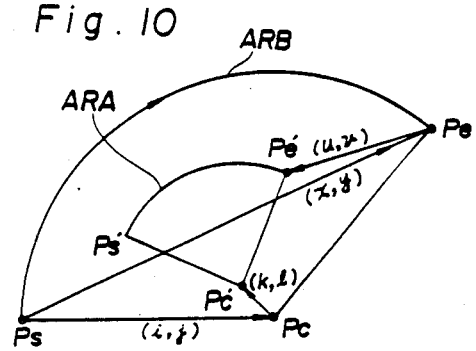

(3) NC data for arcuate motion
G02XxYyIiJjUuVvKkLl; ... clockwise
G03XxYyIiJjUuVvKkLl; ... counter-clockwise In a case where the wire electrode paths on the programmed plane and programmed auxiliary plane are circular arcs ARB, ARA, respectively, as shown in FIG. 10, the paths are specified by the arcuate motion G-function instruction "G02" (clockwise) or "G03" (counter-clockwise) and the numerical values that follow the word addresses "X", "Y", "I", "J", "U", "V", "K", 37 L" respectively. The numerical values x, y following the word addresses "X", "Y" indicate incremental values along the respective axes from an arc starting point $P_s$ to an arc end point $P_e$ on the programmed plane, and the numerical values i, j following the word addresses "I", "J" indicate incremental values along the respective axes from the arc starting point $P_s$ to the center $P_c$ of the arc. The numerical values u, v following the word addresses "U", "V", respectively, are deviation quantities along the respective axes between the circular arc end point $P_e$ on the programmed plane and a circular arc end point $P_e'$ on the programmed auxiliary plane (a deviation quantity in the direction of workpiece thickness is not considered). The numerical values k, 1 following the word addresses "K", "L", respectively, are deviation quantities along the respective axes between the center $P_c$ of the circular arc on the programmed plane and the center $P_c'$ of the circular arc on the programmed auxiliary plane.

Figure 11:
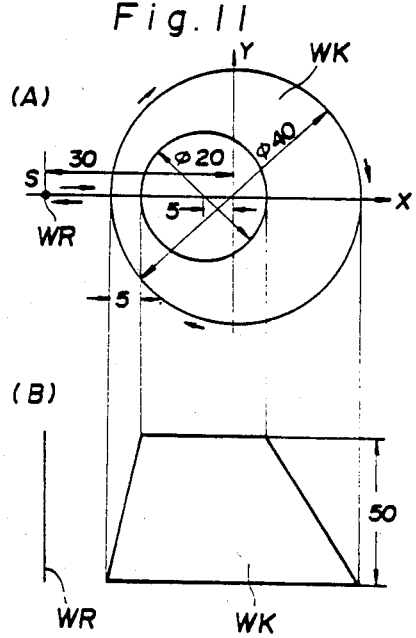
Figure 12:
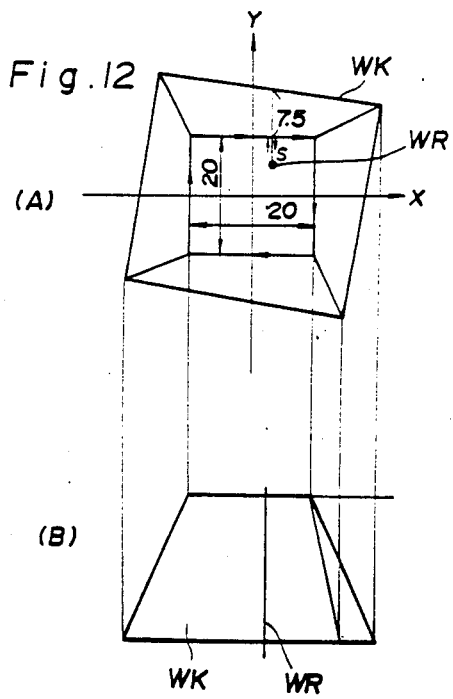

The following are examples of NC data shown in FIGS. 11 and 12, in which WR denotes the wire electrode, and WK the workpiece. In each Figure (A) shows a plan view and (B) a front view.

Example of NC data in FIG. 11 (where the workpiece thickness is 50 mm, the programmed plane is the lower plane of the workpiece, and the wire electrode travels in the direction of the arrow from a point S):
G92X-30.0I50.0;
G41G01X10.0U5.0;
G02I20.0K-5.0;
G40G01X-10.0U0;
M02;

Example of NC data in FIG. 12 (where the workpiece thickness is 50 mm, the programmed plane is the upper plane of the workpiece, and the wire electrode travels in the direction of the arrow from a point S):
G92X2.5Y5.0I-50.0;
G42G01Y5.0V7.5;
X7.5U10.0V5.0;
Y-20.0U5.0V-10.0;
X-20.0U-10.0V-5.0;
Y20.0U-5.0V10.0;
X12.5U0V7.5;
G40Y-5.0V0;
M02;

In the above NC data, "G41", "G42" represent the direction of wire diameter compensation, "G40" indicates cancellation of wire diameter compensation, and "M02" denotes the end of the program.

Let us now return to FIG. 5 to describe the method of the present invention.

(a) First, auxiliary data is entered from a manual data input unit (abbreviated to "MDI unit") 102. The auxiliary data include, with reference to FIG. 7, vertical distance H from the lower guide DG to the upper guide UG, vertical distance h from the lower guide DG to the programmed plane (lower plane of workpiece) BPL, vertical distance t from the programmed plane to a velocity control plane VCP, wire diameter compensation quantity D, travelling velocity f on the velocity control plane, and the like, these being entered from the MDI unit. Machining velocity f and distance t may entered from the NC tape 1. Also, rather than commanding the travelling velocity directly, so-called servofeed may be adopted wherein travelling velocity is commanded by a machining power supply.

The data entered from the MDI unit 102 are read and stored in a RAM 105 by a processor 104 under the control of a control program stored in a ROM 103.

(b) Next, a start key, not shown, on an operator's panel 106 is pressed, whereupon the processor 104 starts a tape reader 107 to read two items of NC data, namely data of a current block and data of the next block, and store the data in the RAM 105.

(c) Thereafter, the processor 104, under the control of the control program, obtains an offset path on the programmed plane and on the programmed auxiliary plane by using the wire diameter compensation quantity D, which has been stored in the RAM 105, the data indicative of wire diameter compensation direction, which are contained in the NC data, and the path data in the current and next blocks.

Figure 13:
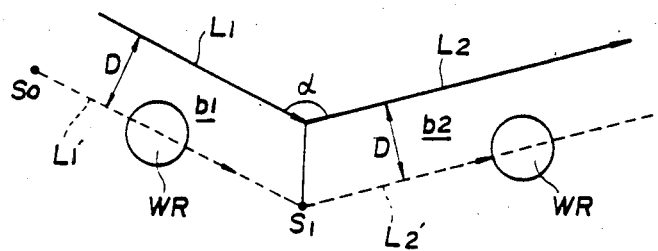
FIG. 13 is a view for describing offset processing.

FIG. 13 is a view for describing offset path calculation. Assuming that a programmed path comprises two straight lines $L_1$, $L_2$, as shown in FIG. 13, wire diameter compensation is carried out through a sequence of pre-reading a move command in a current block $b_1$ and a move command in the next block $b_2$, obtaining a straight line $L_1'$ by offsetting the straight line $L_1$ in the current block $b_1$ by the wire diameter compensation quantity D as well as a straight line $L_2'$ by offsetting the straight line $L_2$ of the next block $b_2$ by the wire diameter compensation quantity, and computing the coordinate values of the point $S_1$ at which the straight lines $L_1'$ and $L_2'$ intersect. When this has been accomplished, the path connecting the end point $S_0$ of the preceding block and the point $S_1$ will be the offset path.

(d) At the end of offset processing, the processor 104 calculates incremental quantities $(X_{w1}, Y_{w1})$, $(X_{w2}, Y_{w2})$ along the respective axes on the programmed plane and programmed auxiliary plane if the current block calls for linear motion, or calculates incremental quantities from circular arc end points to circular arc starting points and to centers of the circular arcs on the programmed plane and programmed auxiliary plane if the current block calls for arcuate motion. If the current block calls for linear cutting and an incremental quantity G01XxYyUuVv;

is commanded, then the processor 104 obtains incremental quantities along the respective axes in accordance with the equations $$\left.\begin{array}{l} X_{w1} = x \\ Y_{w1} = y \\ X_{w2} = x + u \\ Y_{w2} = y + v \end{array}\right\} \quad (3)$$

and stores these quantities in the RAM 105. [Since offset processing is being executed, the incremental quantities along the respective axes naturally will be slightly different from (3). To simplify the discussion, however, the description is based on the assumption that the axial incremental quantities are expressed by the equations (3)].

(e) Next, the processor 104 calculates, and stores in the RAM 105, incremental quantities $X_f$, $Y_f$ on the velocity control plane, incremental quantities $X_d$, $Y_d$ for the lower guide, and incremental quantities $X_u$, $Y_u$ for the upper guide in accordance with the following equations:

$$X_f = X_{w1} + u \cdot (t/T) \tag{4a}$$

$$X_f = Y_{w1} + v \cdot (t/T) \tag{4b}$$

$$X_d = X_{w1} - u \cdot (h/T) \tag{4c}$$

$$Y_d = Y_{w1} - v \cdot (h/T) \tag{4d}$$

$$X_u = X_{w1} + u \cdot (H-h)/T \tag{4e}$$

$$Y_u = Y_{w1} + V \cdot (H-h)/T \tag{4f}$$

(f) At the end of the calculations in accordance with Eqs. (4a) through (4f), the processor 104 calculates, and stores in the RAM 105, the travelling distances $L_d$, $L_u$, $L_f$ on the lower guide plane, upper guide plane and velocity control plane, respectively:

$$L_d = \sqrt{X_d^2 + Y_d^2} \tag{5a}$$

$$L_u = \sqrt{X_u^2 + Y_u^2} \tag{5b}$$

$$L_f = \sqrt{X_f^2 + Y_f^2} \tag{5c}$$

Thereafter, it is permissible to find the travelling velocities $f_d$, $f_u$ of the lower and upper guides from $$f_d = f \cdot L_d / L_f \tag{6a}$$

$$f_u = f \cdot L_u / L_f \tag{6b}$$

perform interpolation calculations along two axes simultaneously using the incremental quantities $X_d$, $Y_d$ for the lower guide obtained in accordance with (4c) and (4d), concurrently perform interpolation calculations along two axes simultaneously using the incremental quantities $X_u$, $Y_u$ for the upper guide obtained in accordance with (4e) and (4f), and move the upper and lower guides relative to the workpiece in response to pulses obtained through each of the interpolation calculations. However, in the illustrated embodiment, the method adopted in the following steps (g) through (i) includes finding travel quantities $\Delta x_d'$, $\Delta y_d'$, $\Delta x_u'$, $\Delta y_u'$ for moving the lower and upper guides along the respective axes in a time period $\Delta T$ preset as a parameter, applying $\Delta x_d'$, $\Delta y_d'$, $\Delta x_u'$, $\Delta y_u'$ to a pulse interpolator every $\Delta T$ seconds, and causing the pulse interpolator to distribute these quantities smoothly in the form of pulses along the respective axes independently to move the upper and lower guides relative to the workpiece.

(g) After calculating the travelling distances in accordance with Eqs. (5a) through (5c), the processor 104 obtains a shift quantity s necessary for shifting the most significant bit of the largest value among $L_d$, $L_u$, $L_f$ to the most significant digit (MSD) of an m-bit register, and stores the shift quantity in the RAM 105. Note that m is the number of bits of a general purpose register in the processor 104.

(h) Next, an addition frequency $f_n$ of a DDA interpolation calculation performed in the time period $\Delta T$ is calculated in accordance with the equations $$f_n = \Delta T \cdot f \cdot K_f \tag{7}$$

$$K_f = 2^m/(L_f 2^s) \quad (8)$$

and this is stored in the RAM 105. Eq. (7) is derived in the following manner:

The incremental quantities $X_d$, $Y_d$, $X_u$, $Y_u$ for the lower and upper guides are each multiplied s times (s-bit shift), these are then stored in the m-bit register, and a two-axis simultaneous DDA interpolation calculation is performed at the respective adding rates $f_{n1}$, $f_{n2}$ (times/second). By doing so, the respective travel quantities $\Delta x_d$, $\Delta y_d$ for moving the lower guide in one second of time take on the form $$\Delta x_d = X_d \cdot 2^s \cdot f_{n1}/2^m \quad (9a)$$

$$\Delta y_d = Y_d \cdot 2^s \cdot f_{n1}/2^m \quad (9b)$$

and the respective travel quantities $\Delta x_u$, $\Delta Y_u$ for moving the upper guide in one second of time take on the form $$\Delta x_u = X_u \cdot 2^s f_{n2}/2^m \quad (9c)$$

$$\Delta y_u = Y_u \cdot 2^s f_{n2}/2^m \quad (9d)$$

Accordingly, the velocities $f_d$, $f_u$ of the lower and upper guides may be written as follows:

$$f_d = (L_d \cdot 2^s/2^m) \cdot f_{n1} \quad (10a)$$

$$f_u = (L_u \cdot 2^s/2^m) \cdot f_{n2} \quad (10b)$$

Since the following relations will hold:

$$f_d/f = L_d/L_f, \quad f_u/f = L_u/L_f \quad (11)$$

the following will hold true from Eqs. (10l), (10b), (11):

$$f_{n1} = (2^m/L_d \cdot 2^s) \cdot f_d = (2^m L_f 2^s) \cdot f \quad (12a)$$

$$f_{n2} = (2^m/L_u \cdot 2^s) \cdot f_u = (2^m/L_f 2^s) \cdot f \quad (12b)$$

Since Eqs. (12a), (12b) each represent the frequency of additions per minute, the frequency $f_n$ in the period of time $\Delta T$ may be written $$f_n = (2^m/L_f 2^s) \cdot f \cdot \Delta T \quad$$

Letting $K_f = 2^m/L_f 2^s$, we arrive at Eq. (7). Note that $K_f$ is calculated prior to the interpolation calculations.

(i) After the calculation of the addition frequency $f_n$, the travel quantities $\Delta x_d'$, $\Delta y_d'$, $\Delta x_u'$, $\Delta y_u'$ for the upper and lower guides during the period of time $\Delta T$ are calculated from the equations $$\Delta x_d' = X_d \cdot 2^s \cdot f_n/2^m \quad (13a)$$

$$\Delta y_d' = Y_d \cdot 2^s \cdot f_n/2^m \quad (13b)$$

$$\Delta x_u' = X_u \cdot 2^s \cdot f_n/2^m \quad (13c)$$

$$\Delta y_u' = Y_u \cdot 2^s \cdot f_n/2^m \quad (13d)$$

(j) When the travel quantities $\Delta x_d'$, $\Delta Y_d'$, $\Delta x_u'$, $\Delta Y_u'$ for the lower and upper guides during the period of time $\Delta T$ have been calculated from the equations (13a) through (13d), the processor 104 applies these to a pulse interpolator 108. On the basis of the travel quantities input thereto, the pulse interpolator 108 performs a pulse interpolation calculation for smoothly distributing pulses independently along the respective axes during the period of time $\Delta T$. Interpolated pulses $P_{dx}$, $P_{dy}$, $P_{ux}$, $P_{uy}$ obtained as a result of the pulse interpolation calculation are applied to respective servo circuits 109 through 112, whereby the upper and lower guides are moved relative to the workpiece. With each passage of the period of time $\Delta T$, the calculations of steps (h), (i) are performed and the following operations are executed to update present positions $x_{ad}$, $y_{ad}$, $x_{au}$, $y_{au}$ stored in the RAM 105:

$$x_{ad} + \Delta x_d' \to x_{ad} \quad (14a)$$

$$y_{ad} + \Delta y_d' \to y_{ad} \quad (14b)$$

$$x_{au} + \Delta x_u' \to x_{au} \quad (14c)$$

$$y_{au} + \Delta y_u' \to y_{au} \quad (14d)$$

The processor also performs the operations $$x_{rd} - \Delta x_d' \to x_{rd} \quad (15a)$$

$$y_{rd} - \Delta y_d' \to y_{rd} \quad (15b)$$

$$x_{ru} - \Delta x_u' \to x_{ru} \quad (15c)$$

$$y_{ru} - \Delta y_u' \to y_{ru} \quad (15d)$$

to update quantities $x_{rd}$, $y_{rd}$, $x_{ru}$, $y_{ru}$ indicative of distances remaining to be travelled, which are stored in the RAM 105. The inital values of the remaining travel quantities $x_{rd}$, $y_{rd}$, $x_{ru}$, $y_{ru}$ are the incremental quantities $X_d$, $Y_d$, $X_u$, $Y_u$, which were calculated in accordance with Eqs. (4c) through (4f). Further, the processor 104 determines every $\Delta T$ seconds whether the following hold:

$$x_{rd} \geq \Delta x_d' \quad (16a)$$

$$y_{rd} \geq \Delta y_d' \quad (16b)$$

$$x_{ru} \geq \Delta x_u' \quad (16c)$$

$$y_{ru} \geq \Delta y_u' \quad (16d)$$

If the relations (16d) through (16d) are satisfied, then $\Delta x_d'$, $\Delta y_d'$, $\Delta x_u'$, $\Delta y_u'$ are delivered to the pulse interpolator with each lapse of $\Delta T$ seconds. If relations (16a) through (16d) are not satisfied, on the other hand, $x_{rd}$, $y_{rd}$, $x_{ru}$, $y_{ru}$ are delivered to the interpolator 108 to move the upper and lower guides relative to the workpiece.

(k) When the wire reaches the end point of the current block, or in other words, when $x_{rd}=0$, $y_{rd}=0$, $x_{ru}=0$, $y_{ru}=0$, the processor 104 causes the tape reader 107 to read the next block of NC data from the NC tape 101 and repeats processing from step (c) onward. Note that when an item of NC data is "M02", which is indicative of the end of the program, wire discharge machining ends.

For linear motion, $K_f$ in Eq. (7) is expressed by Eq. (8). For arcuate motion, however, $K_f$ cannot be expressed by Eq. (8). Instead, we have $$K_f = \theta_d \cdot (2^m/L_f \cdot 2^s) \cdot f \ldots (17a) \ldots \text{lower guide}$$

$$K_u = \theta_u \cdot (2^m/L_f \cdot 2^s) \cdot f \ldots (17b) \ldots \text{upper guide}$$

The reasons are as follows.

Let $X_d$, $Y_d$ represent incremental quantities along respective axes from the center of the circular arc for the lower guide to the starting point of the arc, and let $X_u$, $Y_u$ represent incremental quantities along respective axes from the center of the circular arc for the upper guide to the starting point of the arc. When these incremental quantities are multiplied by s (s-bit shift) and stored in the m-bit register, followed by performing a circular arc interpolation calculation based on the addition rates $f_{n1}$, $f_{n2}$ (times/second), travel quantities $\Delta x_d$, $\Delta y_d$ along respective axes for moving the lower guide during one second of time take on the form $$\Delta x_d = y_d \cdot 2^s \cdot f_{n1}/2^m \tag{18a}$$

$$\Delta y_d = x_d \cdot 2^s \cdot f_{n1}/2^m \tag{18b}$$

and travel quantities $\Delta x_u$, $\Delta y_u$ along respective axes for moving the upper guide during one second of time take on the form $$\Delta x_u = y_u \cdot 2^s \cdot f_{n2}/2^m \tag{18c}$$

$$\Delta y_u = x_u \cdot 2^s \cdot f_{n2}/2^m \tag{18d}$$

Accordingly, the velocities $f_d$, $f_u$ of the lower and upper guides, respectively, may be written $$f_d = \sqrt{\Delta x_d^2 + \Delta y_d^2} = R_d \cdot 2^s \cdot f_{n1}/2^m \tag{19a}$$

$$f_u = \sqrt{\Delta x_u^2 + \Delta y_u^2} \ R_u \cdot 2^s \cdot f_{n2}/2^m \tag{19b}$$

where $R_d$, $R_u$ are the radii of the circular arcs for the lower and upper guides, respectively. Letting $L_d$, $L_u$ represent the travelling distances of the lower and upper guides, respectively, and $L_f$ the travelling distance in the velocity control plane, the following will hold:

$$f_d/f = L_d/L_f,\ f_u/f = L_u/L_f \tag{20}$$

Therefore, from Eqs. (19a), (19b), (20), we will have $$f_{n1} = (2^m/R_d \cdot 2^s) \cdot f_d = (L_d/R_d)/(2^m/L_f 2^s) \cdot f \tag{21a}$$

$$f_{n2} = (2^m/R_u \cdot 2^s) \cdot f_u = (L_u/R_u)/(2^m/L_f 2^s) \cdot f \tag{21b}$$

Letting $L_d/R_d = \theta_d$ (central angle), $L_u/R_u = \theta_u$ (central angle), we arrive at Eqs. (17a), (17b).

The foregoing is for a case where the path data relating to the upper and lower planes of the workpiece are converted into lower and upper guide path data in accordance with Eqs. (4c) through (4f), and an interpolation calculation is performed based on the lower and upper guide path data following the conversion to move the lower and upper guides relative to the workpiece. With this method, however, in a case where the commanded contours are circular arcs on the upper and lower planes of the workpiece and the central angles of the circular arcs differ, the actually cut contours will not be accurate circular arcs on the upper and lower planes of the Workpiece but will instead be somewhat trochoidal in shape. The reasons will be described in conjunction with FIG. 14.

Figure 14:
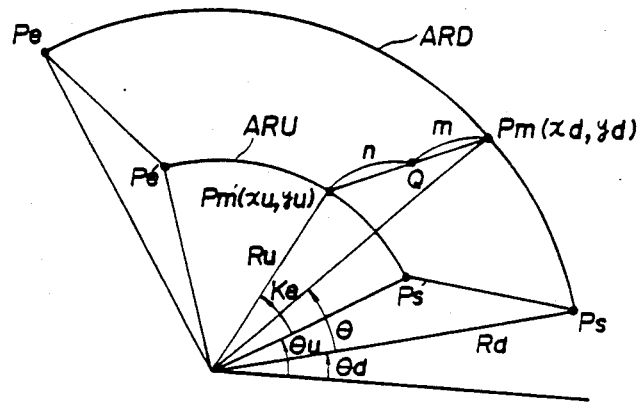
FIG. 14 is a view for describing an inconvenience of the first wire electric discharge machining method.

In FIG. 14, ARD repersents a circular arc trajectory on the plane of the lower guide, and ARU represents a circular arc trajectory on the plane of the upper guide. When the lower guide is moved from the starting point $P_s$ of a circular arc to the end point $P_e$ thereof, the upper guide also is moved from the starting point $P_s'$ of a circular arc to the end point $P_e'$ thereof. Let $(x_d, y_d)$, $(x_u, y_u)$ represent the coordinate values of intermediate points $P_m$, $P_m'$ corresponding to the upper and lower guides, respectively, let $\theta_d$, $\theta_u$ represent angles to the starting points $P_s$, $P_s'$, respectively, let $\theta$, $k \cdot \theta$ stand for angles from the starting points $P_s$, $P_s'$ of the intermediate points $P_m$, $P_m'$, respectively, and let $R_d$, $R_u$ be the radii of the circular arcs for the lower and upper guides, respectively. We will then have $$x_d = R_d \cdot \cos(\theta + \theta_d)$$

$$y_d = R_d \cdot \sin(\theta + \theta_d)$$

$$x_u = R_u \cdot \cos(k \cdot \theta + \theta_u)$$

$$y_u = R_u \cdot \sin(k \cdot \theta + \theta_u)$$

where $k = (\theta_u/\theta_d)$. Accordingly, the coordinate values $x_q$, $y_q$ of a partitioning point Q partitioning the line segment $P_m P_m'$ into a ratio m:n are as follows:

$$x_8 = n \cdot R_d \cdot \cos(\theta + \theta_d)/(m + n) + \tag{22a}$$
$$n \cdot R_u \cdot \cos(k \cdot \theta + \theta_u)/(m + n)$$

$$y_8 = n \cdot R_d \cdot \sin(\theta + \theta_d)/(m + n) + \tag{22d}$$
$$n \cdot R_u \cdot \sin(k \cdot \theta + \theta_d)/(m + n)$$

These Eqs. (22a), (22b) indicate that the trajectory of the partitioning point Q is trochoidal in shape.

Figure 15:
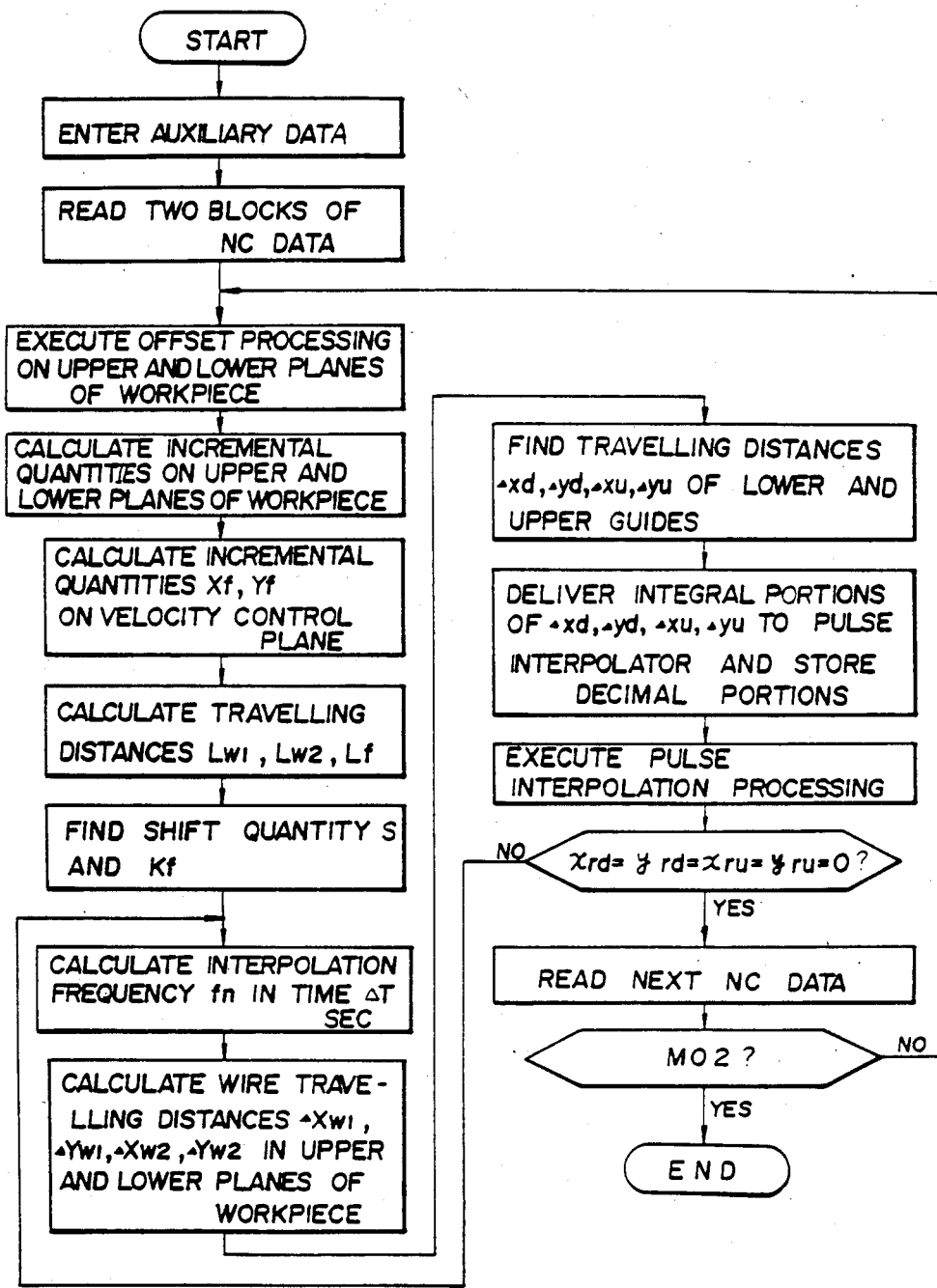
FIG. 15 is a flowchart of processing associated with a second wire electric discharge machining method.

FIG. 15 shows a processing method for a second wire electric discharge machining method according to the present invention. According to this second method, the actually cut contours are accurate circular arcs on the upper and lower planes of the workpiece, unlike the contours cut according to the first method. The hardware for practicing the second method has the same arrangement as that shown in FIG. 5.

(a) Auxiliary data are entered from the MDI unit 102.

(b) Next, the start button on the operator's panel 106 is pressed, whereupon the processor 104 starts the tape reader to read two items of NC data, namely the current block and the next block of data, with the data being stored in the RAM 105.

(c) Thereafter, under the control of the control program, the processor 104 obtains offset paths on the programmed plane and programmed auxiliary plane by using the wire diameter compensation quantity D, which has been stored in the RAM 105, the wire diameter compensation direction data, which are contained in the NC data, and the path data in the current and next blocks.

(d) At the end of offset processing, the processor calculates incremental quantities $(X_{w1}, Y_{w1})$, $(X_{w2}, Y_{w2})$ along the respective axes in the programmed plane and programmed auxiliary plane if the current block calls for linear motion, or calculates incremental quantities from circular arc starting points to circular arc end points and from circular arc starting points to centers of the circular arcs on the programmed plane and programmed auxiliary plane if the current block calls for arcuate motion. If the current block calls for linear motion and an incremental quantity
G01XxYyUuVv;
is commanded, then incremental quantities along the respective axes are calculated in accordance with the equations (3).

(e) Next, the processor 104 calculates, and stores in the RAM 105, the axial incremental quantities $X_f$, $Y_f$ on the velocity control plane in accordance with the equations (4a)-(4b).

(f) At the end of the calculations in accordance with Eqs. (4a)-(4b), the processor 104 calculates, and stores in the RAM 105, the travelling distances $L_{w1}$, $L_{w2}$, $L_f$ on the programmed plane, programmed auxiliary plane and velocity control plane, respectively:

$$L_{w1} = \sqrt{X_{w1}^2 + Y_{w1}^2} \quad (23a)$$

$$L_{w2} = \sqrt{X_{w2}^2 + Y_{w2}^2} \quad (23b)$$

$$L_f = \sqrt{X_f^2 + Y_f^2} \quad (23c)$$

(g) After calculating the travelling distances, the processor 104 obtains a shift quantity s necessary for shifting the most significant bit of the largest value among $L_{w1}$, $L_{w2}$, $L_f$ to the most significant digit of the m-bit register, and stores the shift quantity in the RAM 105.

(h) Next, an addition frequency $f_n$ of DDA interpolation calculation performed in the time period $\Delta T$ is calculated in accordance with the equations (7), (8) and stored in the RAM 105.

(i) After calculating the addition frequency $f_n$, the processor 104 calculates, in accordance with the following equations, the travel quantities $\Delta x_{w1}$, $\Delta y_{w1}$, $\Delta x_{w2}$, $\Delta y_{w2}$ for the wire electrode during the period of time $\Delta T$:

$$\Delta x_{w1} = x_{w1} \cdot 2^s \cdot f_n / 2^m \quad (24a)$$

$$\Delta y_{w1} = y_{w1} \cdot 2^s \cdot f_n / 2^m \quad (24b)$$

$$\Delta x_{w2} = x_{w2} \cdot 2^s \cdot f_n / 2^m \quad (24c)$$

$$\Delta y_{w2} = y_{w2} \cdot 2^s \cdot f_n / 2^m \quad (24d)$$

(j) Thereafter, the processor 104 uses the following equations to convert the foregoing travel quantities along the various axes on the upper and lower planes of the workpiece in the period of time $\Delta T$ into upper and lower guide travel quantities $\Delta x_d$, $\Delta y_d$, $\Delta x_u$, $\Delta y_u$ in the period of time $\Delta T$:

$$\Delta x_d = \Delta x_{w1} + (\Delta x_{w2} - \Delta x_{w1})(-h/T) \quad (25a)$$

$$\Delta y_d = \Delta y_{w1} + (\Delta y_{w2} - \Delta y_{w1})(-h/T) \quad (25b)$$

$$\Delta x_u = (\Delta x_{w2} - \Delta x_{w1})(H-h)/T + \Delta x_{w1} \quad (25c)$$

$$\Delta y_u = (\Delta y_{w2} - \Delta y_{w1}) \cdot (H-h)/T + \Delta y_{w1} \quad (25d)$$

(k) When $\Delta x_d$, $\Delta y_d$, $\Delta x_u$, $\Delta y_u$ have been found, the processor 104 delivers their integral portions $\Delta x_d'$, $\Delta y_d'$, $\Delta x_u'$, $\Delta y_u'$ to the pulse interpolator 108. The decimal portions $\Delta x_d''$, $\Delta y_d''$, $\Delta x_u''$, $\Delta y_u''$ of $\Delta x_d$, $\Delta y_d$, $\Delta x_u$, $\Delta y_u$ are stored in the RAM 105.

(m) On the basis of the values input thereto, the pulse interpolator 108 performs a pulse interpolation calculation for smoothly distributing pulses during the period of time $\Delta T$. Interpolated pulses $P_{dx}$, $P_{dy}$, $P_{ux}$, $P_{uy}$ obtained as a result of the pulse interpolation calculation are applied to respective servo circuits 109 through 112 to rotate upper and lower guide drive motors 113DX, 113DY, 113UY, whereby the upper and lower guides are moved relative to the workpiece. With each passage of the period of time $\Delta T$, the processor 104 performs the calculations of steps (h)-(j), updates the present positions $x_{ad}$, $y_{ad}$, $x_{au}$, $y_{au}$, which are stored in the RAM 105, on the basis of Eqs. (14a)-(14d), and updates the remaining travel quantities $x_{rd}$, $y_{rd}$, $x_{ru}$, $y_{ru}$ indicative of distances remaining to be travelled, which are stored in the RAM 105, on the basis of Eqs. (15a)-(15d). Further, the processor 104 determines every $\Delta T$ seconds whether the following hold:

$$x_{rd} \geq \Delta x_d' \quad (26a)$$

$$y_{rd} \geq \Delta y_d' \quad (26b)$$

$$x_{ru} \geq \Delta x_u' \quad (26c)$$

$$y_{ru} \geq \Delta y_u' \quad (26d)$$

If the relations (26d) through (26d) are satisfied, the processor performs the calculations $$\Delta x_d + \Delta x_d'' \to \Delta x_d \quad (27a)$$

$$\Delta y_d + \Delta y_d'' \to \Delta y_d \quad (27b)$$

$$\Delta x_u + \Delta x_u'' \to \Delta x_u \quad (27c)$$

$$\Delta y_u + \Delta y_u'' \to \Delta y_u \quad (27d)$$

delivers the integral portions $\Delta x_d'$, $\Delta x_d'$, $\Delta x_u'$, $\Delta y_u'$ of $\Delta x_d$, $\Delta y_d$, $\Delta x_u$, $\Delta y_u$ to the pulse interpolator 108, and stores the decimal portions $\Delta x_d''$, $\Delta y_d''$, $\Delta x_u''$, $\Delta y_u''$ thereof as new decimal portions in the RAM 105.

If relations (26a) through (26d) are not satisfied, on the other hand, $x_{rd}$, $y_{rd}$, $x_{ru}$, $y_{ru}$ are delivered to the interpolator 108.

(k) When the wire electrode reaches the end point of the current block, or in other words, when $x_{rd}=0$, $y_{rd}=0$, $x_{ru}=0$, $y_{ru}=0$, the processor 104 causes the tape reader 107 to read the next block of NC data from the NC tape 101 and repeats processing from step (c) onward. Note that when an item of NC data is "M02", which is indicative of the end of the program, wire discharge machining ends.

It should be noted that the processing from step (f) onward of the second wire electric discharge machining method can also be performed in the following manner:

(1) The velocities $f_{w1}$, $f_{w2}$ of the wire electrode on the programmed plane and programmed auxiliary plane, respectively, relative to the workpiece are found from the equations $$f_{w1} = f \cdot L_{w1} / L_f$$

$$f_{w2} = f \cdot L_{w2} / L_f$$

(2) Next, interpolation calculations are performed along two axes simultaneously on the programmed plane using $X_{w1}$, $Y_{w1}$, $f_{w1}$ and, at the same time, interpolation calculations are performed along two axes simultaneously on the programmed auxiliary plane using $X_{w2}$, $Y_{w2}$, $f_{w2}$. The calculations of Eqs. (25a)-(25d) are performed whenever an interpolation pulse is generated.

(3) Thereafter, the lower and upper guides are moved along the respective axes by amounts equivalent to the integral portions $\Delta x_d'$, $\Delta y_d'$, $\Delta x_u'$, $\Delta y_u'$ of $\Delta x_d$, $\Delta y_d$, $\Delta x_u$, and the decimal portions $\Delta x_d''$, $\Delta y_d''$, $\Delta x_u''$, $\Delta y_u''$ are stored as new decimal portions.

(4) This is followed by performing the calculations of Eqs. (25a)-(25d) whenever an interpolation pulse is generated, performing the calculations of Eqs. (27a)-(27d), similarly delivering the integral portions $\Delta x_d'$, $\Delta y_d'$, $\Delta x_u'$, $\Delta y_u'$ of $\Delta x_d$, $\Delta y_d$, $\Delta x_u$, $\Delta y_u$ to the pulse interpolator 108, and storing the decimal portions $\Delta x_d''$, $\Delta y_d''$, $\Delta x_u''$, $\Delta y_u''$.

(5) Thereafter, similar processing is performed and, when the wire electrode arrives at the end point of the current block, the next item of NC data is read.

With this third method, however, the wire electrode advances while being moved back and forth in the direction of advance. The disadvantageous result is a slight decline in machining precision. The reasons for this will now be described.

Figure 16:
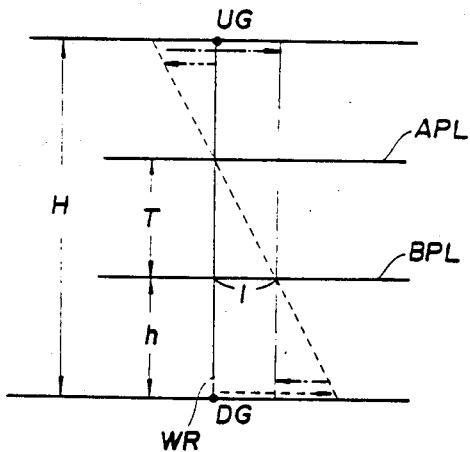
FIG. 16 is a view for describing an inconvenience of a third wire electric discharge machining method.

As shown in FIG. 16, let us consider a case where the workpiece thickness T, the distance h from the lower guide to the lower plane of the workpiece and the distance H from the lower guide to the upper guide are related by the ratio 1:1:3, with the wire electrode WR, which is in a vertical attitude, being moved one pulse at a time along the $+X$ axis in the upper and lower planes of the workpiece. Assuming that an interpolation pulse along the X axis on the lower plane of the workpiece is generated first by the pulse interpolation of step (2), we will have the following from Eqs. (25a), (25c):

$\Delta x_d = 2$, $\Delta x_u = -1$ so that the lower guide is moved along the $+X$ axis by an amount equivalent to two pulses and the upper guide is moved along the $-X$ axis by an amount equivalent to one pulse (see the dotted line in FIG. 16).

Next, assuming that an interpolated pulse along the X direction on the upper plane of the workpiece is generated by the pulse interpolation operation of step (2), we will have the following from Eqs. (25a), (25c):

$\Delta x_d = -1$, $\Delta x_u = 2$ so that the lower guide is moved along the $-X$ axis by an amount equivalent to one pulse and the upper guide is moved along the $+X$ axis by an amount equivalent to two distributed pulses (see the one-dot chain line in FIG. 16). Overall, then, the wire electrode WR moves by an amount equivalent to one pulse along the $+X$ direction in the upper and lower planes of the workpiece. Taking note of movement of the wire electrode in this case, it is seen that the wire electrode advances while being moved back and forth in the following manner: solid line position → dotted line position → one-dot chain line position. Thus, the wire electrode advances while moving back and forth because the upper and lower guides are controlled each time one pulse is generated for the upper and lower planes of the workpiece. This problem does not occur with the second wire electric discharge machining method.

In the foregoing description, it is assumed that the upper and lower guides operate independently. However, for a structure wherein the upper guide is attached to the lower guide and moves in association therewith, the illustrated embodiment can be applied in similar fashion except that movement of the upper guide is represented by an amount of deviation from the lower guide.

Further, though it is assumed that the contours on the upper and lower planes of the workpiece are programmed and entered, it is obvious that contours on any two planes of the workpiece will suffice.

According to the present invention as set forth above, the arrangement is such that the contours to be cut in the upper and lower planes of a workpiece are given as NC data, auxiliary data necessary for moving a wire electrode relative to the workpiece are entered, and paths on the upper and lower planes of the workpiece are converted into paths of upper and lower guides relative to the workpiece. Accordingly, taper cutting can be performed in simple fashion even if a taper varies in a continuous manner and the contours cut in the upper and lower planes of the workpiece differ. In addition, an NC tape is formed from path data specifying the contours to be cut on the upper and lower planes of the workpiece, and it is arranged so that such corrective data as workpiece mounting position, guide positions and amount of wire diameter compensation can be entered separately from an MDI unit. Accordingly, NC data need not be recreated even if the auxiliary data change.

I claim:

1. A wire electrode discharge machining method for cutting a workpiece by moving a wire electrode relative to the workpiece and producing an electric discharge across the wire electrode and the workpiece, comprising the steps of:

preparing and entering path data specifying contours on an upper and on a lower plane of the workpiece;

separately preparing and entering auxiliary data including an amount of wire diameter compensation, workpiece mounting position and guide positions necessary for moving the wire electrode relative to the workpiece;

continuously finding first relative travel quantities ($\Delta x_{w1}$, $\Delta y_{w1}$; $\Delta x_{w2}$, $\Delta y_{w2}$) of the wire electrode with respect to the upper and lower planes of the workpiece over a predetermined period of time;

converting said first relative travel quantities into second relative travel quantities ($\Delta x_u$, $\Delta y_u$; $\Delta x_d$, $\Delta y_d$) of the upper and lower guides with respect to said workpiece by using said auxiliary data including workpiece mounting position and guide position data;

moving the upper and lower guides relative to the workpiece in accordance with said second relative travel quantities;

producing pulses of a number of equivalent to integral portions of said second relative travel quantities to move the uppr and lower guides relative to the workpiece; and correcting subsequent second relative travel quantities of the upper and lower guides with respect to the workpiece by decimal portions of the present second relative travel quantities.

* * * * *

UNITED STATES PATENT AND TRADEMARK OFFICE
CERTIFICATE OF CORRECTION

PATENT NO. : 4,703,146

DATED : Oct. 27, 1987

INVENTOR(S) : Kinoshita

It is certified that error appears in the above-identified patent and that said Letters Patent is hereby corrected as shown below:

Col. 2, line 64, "method," s/b --method of the present invention;--.
Col. 3, line 23, "may" s/b --make--;
      line 64, "Ll" s/b --L1--;
      line 65, Ll" s/b --L1--;
Col. 4, line 5, "37 L"" s/b --"L"--;
      line 66, after "may" insert --be--.
Col. 6, line 13, (4f), "V·" s/b --v·--.
Col. 7, line 35, "(101)" s/b --(10a)--.
Col. 9, line 60, "Workpiece" s/b --workpiece--.
Col. 10, line 23, "$x_8$" s/b --$x_q$--;
Col. 10, line 26, "$y_8$" s/b --$y_q$--;
      line 26, "22a" s/b --22b--.

Col. 11, line 11, (23a), "$X_{w1}^2 + Y_{w1}^2$" s/b --$X_{w1}^2 + Y_{w1}^2$--;

Col. 11,         (23b), "$X_{w2}^2 + Y_{w2}^2$" s/b --$X_{w2}^2 + Y_{w2}^2$--;

line 53, (25c) "$\Delta_{w2}$" s/b --$\Delta X_{w2}$--;

UNITED STATES PATENT AND TRADEMARK OFFICE
CERTIFICATE OF CORRECTION

PATENT NO. : 4,703,146

DATED : October 27, 1987

INVENTOR(S) : Kinoshita

It is certified that error appears in the above-identified patent and that said Letters Patent is hereby corrected as shown below:

Col. 12, line 20, "26d" (first occurrence) s/b —26a—.
line 66, after "$\Delta x_u$," insert — $\Delta y_u$, —.

Col. 13, line 3, change "-" to —)—;
line 4, delete ")".

Signed and Sealed this

Nineteenth Day of April, 1988

Attest:

DONALD J. QUIGG

*Attesting Officer*    *Commissioner of Patents and Trademarks*